Nov. 26, 1963 L. BUCALO 3,111,838
VISCOSITY SENSOR
Filed July 18, 1960 2 Sheets-Sheet 1

INVENTOR.
LOUIS BUCALO
ATTORNEYS

Nov. 26, 1963 L. BUCALO 3,111,838
VISCOSITY SENSOR
Filed July 18, 1960 2 Sheets-Sheet 2

INVENTOR.
LOUIS BUCALO
BY Pennie, Edmonds,
Morton, Barrows and Taylor
ATTORNEYS

3,111,838
VISCOSITY SENSOR
Louis Bucalo, Halesite, N.Y., assignor to The Kinemotive Corp., a corporation of New York
Filed July 18, 1960, Ser. No. 43,584
14 Claims. (Cl. 73—54)

This invention relates generally to viscosity sensing systems and specifically to a viscosimeter wherein a fluid is subjected to the action of two relatively oppositely moving surfaces, and wherein fluid pressure is measured at known positions relative to the surfaces to provide a pressure differential which serves as an index of the viscosity of the fluid.

As is often the case, it is extremely valuable to be able to measure the viscosity of fluids as they are transported during commercial processes. Viscosity may be affected by changes, for example, in percent concentration, in the properties of the incoming ingredients in a continuous flow process, by temperature changes, by impurities in the fluid and by losses due to evaporation or sublimation.

Viscosity ($\mu$) may be defined as the ratio of shear stress in a fluid to the rate of deformation thereof and is constant for a Newtonian fluid. In the past, viscosity has been measured by flow values in tubes, by torque measurements based on the Petroff equation, by comparator systems related to a fluid of known viscosity and by the use of "shear" floats.

In order to be a satisfactory measuring tool in commercial use, as contrasted with laboratory use, a viscosimeter should function satisfactorily under the following conditions:

(a) High temperature and pressure
(b) Continuous monitoring of a tank or pipeline
(c) Wide ranges in different kinds of fluid tested The present invention satisfies the foregoing criteria by providing a viscosimeter which may, for example, be installed at some convenient location within a system employing a fluid whose viscosity is to be sensed. Advantageously, the viscosity of the fluid will be indicated in terms of a pressure differential "across" a body of fluid which has been subjected to certain precise mechanical shear stresses and has thus suffered commensurate deformation. This ratio of stress relative to deformation may be evaluated in terms of the static pressure of the fluid at two relatively separated stations the pressure differential thereof serving as an accurate indicator of the viscosity of the fluid.

More specifically, it is a purpose of the present invention to disclose a device characterized in that a rotor member is driven within a chamber which contains fluid whose viscosity is to be sensed. In one form of the device herein disclosed, the rotor has a generally frusto-conical longitudinal section and is supported at a known clearance from the walls of a correspondingly shaped chamber. The axes of the rotor and the chamber are displaced a known distance such that the surface of the rotor will be eccentric relative to the walls of the chamber. Two pressure sensing ports are defined by the chamber wall which communicate with sensing passages connected to a differntial pressure sensing means. When the rotor is driven at a constant speed, a pressure differential will exist respecting the pressure sensed at ports. This pressure differential is precisely related to the degree of eccentricity of the rotor within the chamber, the speed of rotation of the rotor and the viscosity of the fluid. If all factors excepting the differential pressure and viscosity are maintained constant, changes in viscosity may be measured by the changes in the differential pressure. The arrangement has the further advantage that since the property of differential pressure is sensed, system pressure changes will not materially affect the value of differential pressure.

Variations of the above will be disclosed wherein means are provided for adjustably changing the eccentricity of the rotor relative to the chamber in which it is driven. In another embodiment means are shown for varying amounts of clearance between the rotor and the adjacent chamber walls.

In a further modification according to the invention, the pressure differential in the test chamber is sensed by permitting the walls thereof to be movable in response to different pressures of the fluid acting upon them. The movement of the walls of the chamber is measured to reflect differential pressure within the chamber. The latter structure may be utilized to provide a measurement of differential pressure where it is inconvenient or otherwise impractical to sense pressure by means of pressure sensing ports.

These and other aspects of the invention will become more readily apparent upon a detailed examination of the following description and of the accompanying drawing in which.

Figure 10:
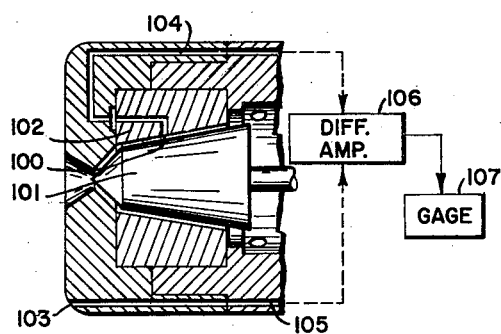
Figure 9:
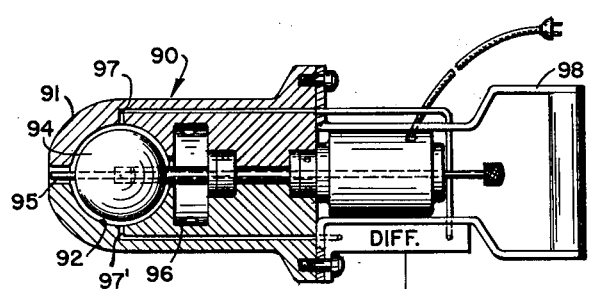

FIG. 9 discloses a modification having a spherical chamber and spherical rotor element; and FIG. 10 illustrates the use of a single pressure port within the sensing chamber.

Figure 1:
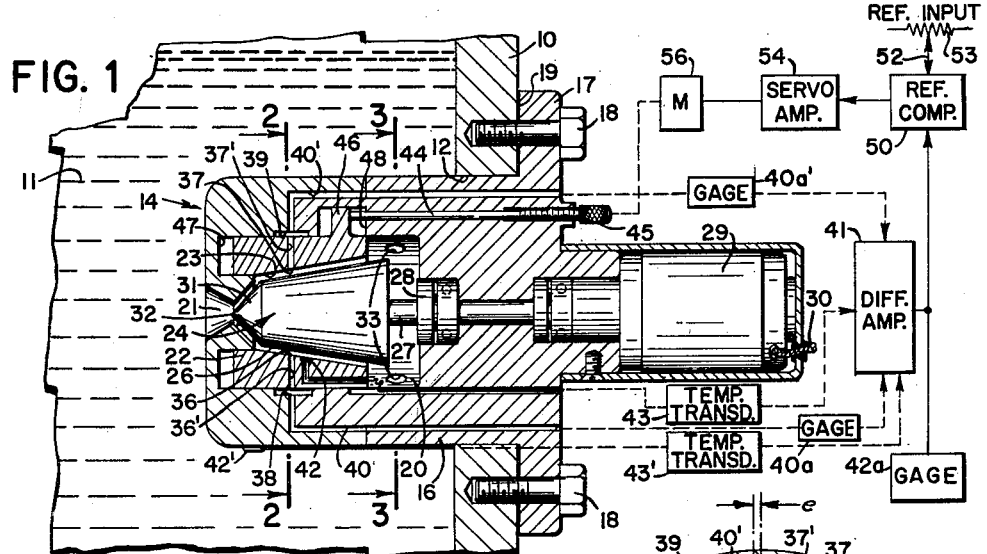
FIG. 1 is an illustration in cross-section of a viscosimeter constructed according to the invention which includes means for varying the effective clearance between the journal and the adjacent walls of the sensing chamber.
Figure 3:
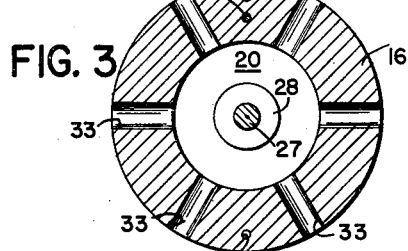
FIG. 3 is a cross-sectional view taken along the lines 3—3 of FIG. 1.
Figure 2:
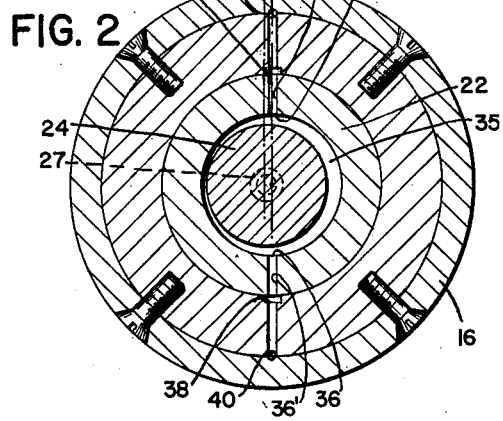
FIG. 2 is a cross-sectional view taken along the lines 2—2 of FIG. 1.

Referring now to the drawing and initially to FIGS. 1-3, reference numeral 10 represents the wall of a conduit or pipe adapted to transport a fluid 11. For various reasons, it is desired to be able to provide a continuous measurement of the viscosity of the fluid 11 as it flows through the conduit. Accordingly, the wall of the conduit has been provided with an aperture 12 for receiving internally of the conduit a portion of a viscosimeter 14. The viscosimeter comprises a generally cylindrical housing 16 having a radially enlarged base flange 17 which fits against the exterior of the conduit wall 10 and is attached thereto by means of bolts 18. A fluid seal is maintained between the flange 17 and the wall 10 by some suitable means such as a gasket 19.

The viscosimeter housing 16 defines a generally cylindrical enclosure 20 having a restricted inlet opening 21 of frusto-conical design. Annular ring member 22 is located within the enclosure 20 for longitudinal sliding movement therein. The outer diameter of ring member 22 conforms closely to the inside diameter of the enclosure 20 and has an inside surface 23 of frusto-conical design. A rotor member 24 is supported within the enclosure 20 generally adjacent to the surface 23 of the annular ring member 22. The rotor 24 is provided with an outer surface 26 which proportionally matches the frusto-conical surface 23 of the ring member 22. The rotor 24 is attached to a shaft 27 supported in a sealed bearing 28 mounted in the housing 16. The shaft 27 is in driving connection with a constant speed motor 29 adapted to be energized by means of the electrical connection 30.

Adjacent the inlet 21, the rotor 24 is provided with an acutely conical section 31. The housing 16 is formed parallel to the conical section 31, thus defining a restricted annular passageway 32. The arrangement is such that when the rotor member 24 is driven by the motor 29, a sampling of the fluid 11 will be drawn into the inlet 21 and through the passageway 32 into enclosure 20. The conical section 31 and the frusto-conical surface 26 of the rotor 24 act as a centrifugal pump, the fluid tending to be drawn toward portions of the rotor of increasing diameter. As best seen in FIG. 3, the end of the enclosure 20 opposite to the inlet orifice 21 has been provided with a plurality of radial outlet passages 33 which permit the discharge of fluid from the enclosure 20. Thus, the rotor acts as a pump to provide a continuous flow of test fluid from the conduit through the viscosimeter.

As will be seen in FIG. 2, the axis of the rotor 24 is offset a distance $e$ from the axis of the cylindrical enclosure as measured along a diameter of the latter. This causes the frusto-conical surface 26 of the rotor to be eccentric with respect to the adjacent surface 23 of the annular ring member 22. The frusto-conical surfaces 23 and 26 of the ring member 22 and the rotor 24 respectively define a sensing chamber 35 lying intermediate the relatively movable surfaces. It has been determined that when the rotor member 24 is rotated in a counterclockwise direction, for example, at a constant speed, a fluid intermediate the relatively rotating surfaces 23, 26 is subjected to shear stresses because of its viscosity, which produces differences in fluid pressure at separate points within the chamber 35. If a pressure differential is taken by comparing any two pressures taken at known stations within the chamber 35, there will be provided an accurate index of the viscosity of the fluid.

Figure 8:
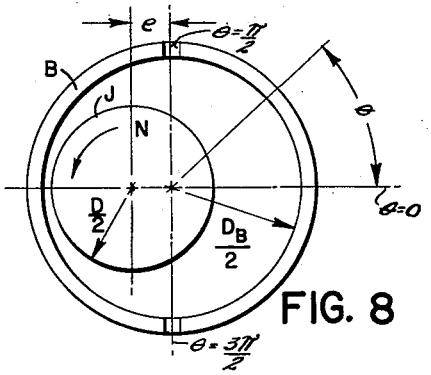
FIG. 8 is a schematic showing of the theoretical basis underlying the structural arrangements disclosed therein.

With specific reference to FIG. 8, it can be shown that the pressure P at any location in the fluid contained in the chamber 35 upon a rotation being imparted by the motor 29 to the rotor 24, is:

$$P = P_0 + 12\pi \left(\frac{D}{C}\right)^2 \mu N \frac{h(2+h\cos\theta)\sin\theta}{(2+h^2)(1+h\cos\theta)^2}$$

Where
$C = D_b - D$
$\mu$ = viscosity
$N$ = rotational speed, instantaneous
$h = 2e$ = eccentricity ratio
$P_0$ = system pressure
$e$ = eccentricity Further, if the two positions within the chamber 35 whose pressure is measured, are located at diametrically opposed points along a vertical axis which is perpendicular to a horizontal axis including the displacement $e$ of the rotor axis relative to the longitudinal axis of the chamber 35 we may compute:

$$\Delta P \Big]_{\theta=\frac{\pi}{2}}^{\theta=\frac{3\pi}{2}} = 12\pi \left(\frac{D}{C}\right)^2 \mu N \left(\frac{4h}{2+h^2}\right)$$

or $$\mu = \frac{\Delta P}{12\pi \left(\frac{D}{C}\right)^2 N \left(\frac{4h}{2+h^2}\right)}$$

However, for the conditions described, D, C, N and $h$ are constant, then $$\mu = \overline{K} \Delta P$$

or: Viscosity = a constant times the pressure differential sensed between stations $$\frac{3\pi}{2} \text{ and } \frac{\pi}{2}$$

In accordance with the foregoing formula, two fluid pressures sensing ports 36, 37 are located in the annular ring member 22 at diametrically vertically opposed positions respective of the longitudinal axis of the chamber 35 and perpendicular to a horizontal diameter which includes the eccentricity $e$ (see FIG. 2). The ports may be located elsewhere but these locations maximize the desired output. The ports connect with passageways 36', 37' which interconnect with two spotfaces or counter-sinks 38, 39 defined within the housing 16. The housing is provided with upper and lower sensing passages 40, 40' for the transmission of the pressure sensed within the chamber 35 respectively at the ports 36, 37. A temperature probe 42 connected to a transducer 43 is provided so that any change in viscosity due to increased temperature which is caused by the agitation of the fluid within the viscosimeter may be interpreted relative to the average temperature of the fluid in the conduit as sensed by a second reference temperature probe 42' and the transducer 43'. As indicated, more or less diagrammatically, the respective pressures in the lines 40, 40' and the output of the temperature transducers 43, 43' will be transmitted to a differential amplifier 41 for comparison. The output from the amplifier 41 may, if desired, be taken as a reading upon a gage 42a in terms of differential pressure or directly as a reading in viscosity.

It may be desirable at times depending upon the characteristic of the fluids being tested or to change the sensitivity of the viscosimeter, to vary the clearance ($C = D_b - D$; see FIG. 8) between the surfaces 26, 23 of the rotor and the annular ring member which surrounds the rotor. This may be done without varying the eccentricity $e$, by causing the annular ring member 22 to translate inwardly longitudinally of the rotor 24. This change in clearance C will cause changes in the differential pressure of the fluid sensed at ports 36, 37 because the fluid will be subjected to greater or less shear stress depending on the clearance C.

One means for causing such relative movement of the members has been disclosed in FIG. 1 comprising a threaded shaft 44 which may be turned by a thumb screw 45 mounted externally of the conduit 10. The inner end of the shaft 44 is attached to an ear 46 integrally formed as a part of the ring member 22. The member 22 is mounted as previously mentioned within the cylindrical enclosure 20 for limited slidable longitudinal movement. The extent of the forward movement thereof is determined by an abutment 47 formed by a forward portion of the housing 16, movement toward the rear being limited by an abutment 48. Thus, the fluid within the chamber 35 intermediate the surfaces 26, 23, of the rotor and the ring member 22 may be subjected to more or less clearance between the relatively rotatable surfaces, and thus more or less stress when the rotor member is driven. Differences in clearance effectively change the pressures sensed at the ports 36, 37, and also differential pressure according to the mathematical formula previously set forth. Of course, the rotation of the shaft 44 may be easily calibrated with respect to the clearance $c$ between the rotor 24 and ring member 22 so the changes in differential pressure due to changes in C may be accurately related to readings of the viscosity of the fluid being tested. It will be noted that the translation of the annular member 22 will not displace the interconnection of the ports 36, 37 with the sensing passages 40, 40' since spotfaces 38, 39 have been provided to accommodate longitudinal shifting of the ports relative to the sensing passages.

The means for longitudinally adjusting the ring member 22 may be employed in a system employing feedback to maintain a constant differential pressure output regardless of changes in the viscosity of a fluid or of different fluids. The system utilizes the so-called "null" principle where reference is made to a standard differential pressure, departures therefrom in sensed differential pressure causing energization of a means to make the sensed differential pressure equal to the reference differential pressure.

Accordingly, the embodiment of FIGS. 1–3 may be modified by employing a reference comparator 50 which senses the output differential of the differential amplifier 41 and compares this output to a reference input 52 provided by means such as a potentiometer 53. The reference comparator 50 will, if a differential from the reference input standard is detected, send a signal to a servo amplifier 54 which is adapted to energize a small reversible electric servo motor 56. The motor 56 is mechanically connected to the shaft 44 which adjusts the position of ring member 22 and thus, controls the clearance $c$, between the ring member and the rotor 24. The output signal from the comparator 50 will be such that the motor 56 will cause the ring member 22 to move to a position where the differential pressure sensed by the amplifier 41 no longer varies from the selected standard.

Figure 4:
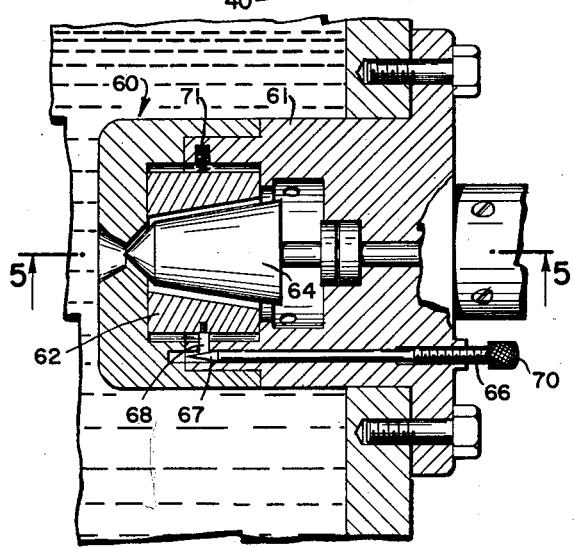
FIGS. 4 and 5 are cross-sectional views of an alternative embodiment wherein means are provided for effecting changes in the eccentricity of the rotor member relative to the chamber in which it rotates.
Figure 5:
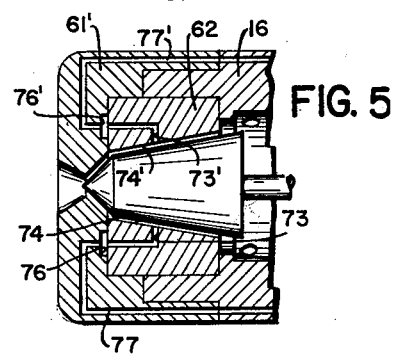

In the embodiment of FIGS. 4 and 5, a viscosimeter 60 is shown which is generally similar in construction to the embodiment of FIGS. 1–3; and consequently, attention will be drawn only to those portions which differ in construction from the foregoing embodiment. The viscosimeter 60 has a housing 61 supporting an annular ring member 62 which eccentrically surrounds a rotor 64, both the ring and rotor members being of generally frusto-conical longitudinal section. However, the ring member 62 in the embodiment is not longitudinally slidable relative to the rotor 64 but rather, may be moved transversely to vary the degree of eccentricity of the rotor relative to the ring member.

One means of causing the aforementioned translation has been shown as a longitudinal rod 66 threadably secured within the housing 61 such that rotation thereof will cause graduated inward or outward movement in a longitudinal direction. The end of the rod 66 defines a conical cam surface 67 which is adapted to engage the end of a transversely slidable push rod 68 affixed to the ring member 62. Therefore, when the rod 66 is rotated by means of a thumb screw 70, the transverse rod 68 and thus, the ring member 62 will be shifted transversely within the viscosimeter housing. A return spring 71 has been provided intermediate the ring member 62 and the housing 61 in opposed relation to the conical camming surface 67 and the push rod 68. The spring 71 will be of sufficients strength not to be affected by pressure from within the rotor chamber acting thereagainst. Consequently, the rotation of the rod 66 will provide an accurate indication of the transverse position of the ring member 62 relative to the axis of the rotor and thus, an accurate index of the displacement factor $e$.

It will be observed with reference to FIG. 5 that two oppositely disposed pressure sensing passages 73, 73' connected to sensing ports 74, 74' have been provided perpendicular to the transverse direction of movement of the ring member relative to the rotor. The passages 73, 73' in the ring member 62 communicate with respective spotfaces 76, 76' in the housing 61 for accommodating the relative movement of the ring member 62 relative to the housing 16. Sensing passages 77, 77' communicate with the spotfaces 76, 76' and thence to the exterior of the housing. The sensing passages may be connected to known means such as has been shown in FIG. 1, for providing a measurement of differential pressure and hence, the viscosity of the fluid in the conduit. It will be appreciated by persons skilled in the art that the feedback system described and illustrated in connection with FIG. 1 may also be employed together with the embodiment of FIGS. 4 and 5.

Figure 6:
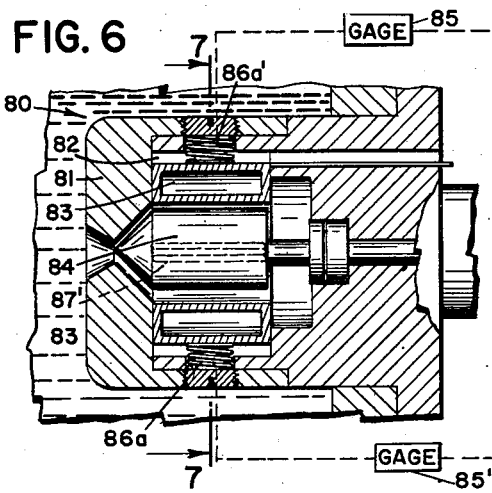
FIGS. 6 and 7 show another embodiment of the invention having separate members displacable according to pressures sensed within the chamber.
Figure 7:
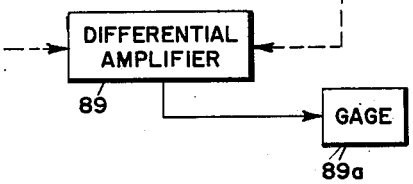
Figure 7:
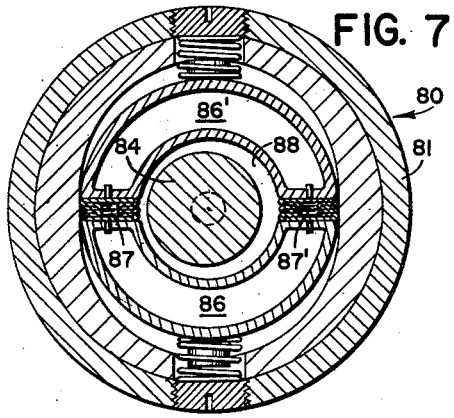

FIGS. 6 and 7 illustrate a somewhat different method of employing the principles previously set forth, wherein a viscosimeter 80 is illustrated. The viscosimeter 80 has a housing 81 which defines a cylindrical enclosure 82 in which a cylindrical ring member 83 is located to encompass a cylindrical rotor 84. As best seen in FIG. 7, the ring member comprises two hollow semi-cylindrical shells 86, 86' interconnected at abutting ends by an expansible means such as the bellows 87, 87'.

The semi-cylindrical halves 86, 86' are displacable radially against a resilient counterforce produced by springs 86a, 86a'. The halves 86, 86' are of generally light-weight construction such that fluid pressure from within a chamber 88 intermediate the members 86, 86' and the rotor 84, acting upon the separate opposing walls of the members 86, 86' will cause them to be transversely or radially displacable relative to each other. The tendency for the upper member 86, for example to be displaced by local fluid pressure within the upper portion of the chamber 88 can thus be compared with the tendency for the lower member 86' to be displaced by a different fluid pressure acting thereagainst (as will be produced by rotation of the rotor 84) to provide a measurement of differential pressure within the chamber. As illustrated, the differential movement of the semi-cylindrical halves 86, 86' may be sensed by an appropriate means such as strain gages 85, 85', for example and transmitted to a differential amplifier 89 whose output may be read upon a gage 89a associated therewith in terms of fluid viscosity. It is contemplated that the embodiment of FIGS. 6 and 7 will be especially useful where the viscosity of the fluid being tested is extremely great such that the measuring of pressure by sensing ports within the chamber 88 would be subect to inaccuracies.

In FIG. 9 a viscosimeter 90 is shown which has a housing 91 defining a spherical test chamber 92 intermediate the housing and a spherical rotor 94. The viscosimeter 90 has been provided with inlet means 95 and outlet means 96 to and from the chamber 92 and sensing passages 97, 97' connecting with the chamber 92 according to the principles illustrated previously. Some pumping action will be present due to the spherical shape of the rotor 94, however, it is thought that the embodiment of FIG. 9 will not be used as an on-stream device such as in the previous embodiments, but rather, for testing the viscosity of fluids in open containers and the like. The visconsimeter 90 is portable having a handle 98 that may be held while the inlet end thereof is dipped into a vat holding a test fluid. Of course, any of the previously discussed embodiments may be made portable and may serve in a similar manner.

FIG. 10 illustrates a modification of the invention utilizing structure similar to that shown in FIG. 5. In the embodiment of FIG. 10, only one sensing port 100 has been provided within the test chamber defined by a rotor 101 and the annular ring member 102. A second port 103 is located in the housing of the viscosimeter in a position to sense system pressure or $P_0$. The respective pressures sensed by the ports 100 and 103 will be reflected within the sensing passages 104, 105 and therefrom to a differential amplifier 106. As in the earlier embodiments, the differential pressure will provide an indication of the viscosity of the fluid, the latter value being read upon the gage 107. Since the differential pressure sensed by the embodiment of FIG. 10 includes system pressure or $P_0$ the differential pressure sensed will vary with changes in $P_0$ which would not be the case for the dual port systems of the preceding specific embodiments.

It will be apparent that the foregoing description relates to specific embodiments and is merely representative. Various changes may be made therefrom without departing from the teachings of the invention. For example, although a single rotor member has been disclosed, which is driven relative to the wall of a surrounding chamber, it is obvious that the rotor element may remain stationary and the outer wall of the chamber driven relative thereto. Or both may be driven in counter rotation. It is equally true that it is not absolutely necessary to drive the rotor at a constant speed. Provided that suitable calibrations of differing rotor speeds is made, the rotor speed may be varied to increase or decrease the sensitivity of the device, with higher rotor speeds producing greater amplification of the pressure differential which will be sensed when testing a given fluid.

Further, those skilled in the art will appreciate that the sensing of pressures within a fluid subjected to internal shear stresses, and the taking of a differential pressure reading thereof, may be measured in several ways other than those disclosed specifically in connection with the particular embodiments described above. These have indicated that a pressure differential within the test chamber (i.e., the chamber defined by the rotor and the surrounding portions of the housing) may be sensed by the use of two separated pressure ports within the test chamber or by sensing the movement of relatively movable parts of the housing which define the chamber. As in FIG. 10 it is also possible to have only one port within the test chamber, which will then provide a pressure reading relative to system pressure or $P_0$.

Where the two ports are provided within the test chamber, they need not necessarily be located in the same transverse plane, as has been illustrated. The optimum location will normally be at $$\theta = \frac{\pi}{2} \text{ and } \frac{3\pi}{2}$$

at a position intermediate the length of the rotor; however two ports may be situated in line relative to the longitudinal axis of the test chamber, or two pairs of ports may be so aligned. With suitable calibration, two sensing ports may be longitudinally disposed and misaligned. These various alternate locations have been proposed merely to show that the teaching of the present disclosure is sufficiently broad to encompass the above generally equivalent means for measuring viscosity.

Thus, the several forms of the present invention each possesses the advantage of providing an indication of viscosity by measuring the pressure of a fluid which has been subjected to internal shear stresses. The term "fluid" has been used purposefully throughout the present disclosure since it is obvious that the invention has application to the measuring of the viscosity of gases as well as liquids. The advantage of pressure measurement over torque sensitive measurements of viscosity for example, is that bearing torque or torque effects produced by fluid sealing elements does not have to be calibrated out in order to obtain true viscosity readings.

Since changes may be made from what has been specifically shown and described without departing from the teachings of the invention, in order to appreciate fully the spirit and scope of the present invention, reference should be made to the appended claims, in which I claim:

1. A viscosity sensor comprising a housing defining a chamber having a transverse circular cross-section, a rotor having a transverse circular cross-section mounted within said chamber, the longitudinal axis of said rotor being parallel to the longitudinal axis of said chamber and displaced therefrom a predetermined distance to provide an eccentricity between the surface of said rotor and the interior surface of said housing, the diameters of said rotor and said chamber defining a predetermined varying clearance extending continuously between the periphery of said rotor and the interior surface of said housing, means for driving said rotor at a predetermined speed, inlet means to said chamber for admitting fluid thereto and pressure sensing means for sensing different pressures of the fluid within separate circumferentially displaced portions of said chamber respective of the interior surface of said housing and intermediate the rotor and housing defining said clearance, and means for registering a differential of said different sensed pressures to provide an indication of the viscosity of the fluid when said rotor is driven in said chamber.

2. A viscosity sensor according to claim 1 in which said pressure sensing means includes sensing ports defined by the wall of said chamber and sensing passages connected to said ports.

3. A viscosity sensor according to claim 2 in which said chamber and said rotor are defined at least in part by members having generally parallel longitudinal frusto-conical cross-sections, said inlet means being located adjacent said rotor at a minimum diameter thereof and outlet means from said chamber being provided adjacent a maximum diameter of said rotor.

4. A viscosity sensor according to claim 3 in which the member defining said chamber is an annular ring adjustably movable within said housing in a longitudinal direction to vary the clearance between said rotor and said chamber and means are provided for causing the longitudinal adjustment of said ring.

5. A viscosity sensor according to claim 4 which includes means for adjusting the annular ring relative to the periphery of said rotor to maintain the sensed differential pressure equal to a selected reference differential pressure, said last-mentioned means comprising means associated with said sensing passages for measuring differential pressure and for providing an output in accordance with sensed differential pressure, means for receiving said sensed differential pressure and for comparing the value thereof with a selected reference differential pressure, said comparing means being used to actuate a means for adjusting said annular ring relative to the periphery of said rotor by a predetermined extent in a direction to maintain the sensed differential pressure equal to the selected reference differential pressure.

6. A viscosity sensor according to claim 3 in which the member defining said chamber is movable transversely of the axis of the rotor to vary the displacement of said axis relative to the axis of said chamber.

7. A viscosity sensor according to claim 2 in which said chamber and rotor are spherical in shape.

8. A viscosity sensor according to claim 1 in which said chamber is defined by members transversely displaceable relative to each other in response to differences in pressure within said chamber reacting upon said members.

9. A viscosity sensor according to claim 7 in which said members form opposing portions of a generally cylindrical chamber, said portions being connected by an expansible bellows, and being connected to a sensing means for determining the relative displacement of each of said portions with respect to the other.

10. A viscosity sensor comprising a housing, a portion of which is adapted to be received within an aperture in the wall of a conduit carrying a fluid whose viscosity is to be measured, a base flange on said housing for attachment to exterior portions of the wall of said conduit adjacent said aperture, means for maintaining a fluid-tight seal between said base and said conduit, said housing defining a chamber for the admission of fluid from said conduit, said chamber having a frusto-conical longitudinal section and inlet means communicating adjacent the portion of least diameter of said frusto-conical section, a rotor having a major surface of generally frusto-conical longitudinal section disposed in said chamber with the axis thereof generally parallel to the axis of said chamber and displaced therefrom a predetermined distance to provide an eccentricity between the surfaces of said rotor and said housing, said chamber and said rotor having a known varying clearance therebetween continuously extending between the adjacent surfaces of said rotor and housing, said rotor also having a second surface of longitudinal conical section forming the apex thereof adjacent the inlet to said chamber, means for driving said rotor at a predetermined speed and outlet means removed from said inlet means for exhausting fluid from said chamber to said conduit, and said chamber defining sensing ports communicating with sensing passages for providing a measurement of different fluid pressures intermediate adjacent eccentrically positioned surfaces of said rotor and housing in said chamber at separate positions therein displaced circumferentially with respect to the interior surface of said housing.

11. A viscosity sensor according to claim 10 wherein said inlet to said chamber is of frusto-conical longitudinal section decreasing in diameter toward the apex of said rotor.

12. A viscosity sensor comprising a housing defining a chamber having a transverse circular cross-section, a member having a transverse circular cross-section mounted within said chamber, the longitudinal axis of said member being parallel to the longitudinal axis of said chamber and displaced therefrom a predetermined distance to provide an eccentricity between the surfaces of said member and housing, the diameters of said member and said chamber defining a predetermined varying clearance about the periphery of said member extending continuously between the adjacent surfaces of said member and housing, driving means for causing relative rotation between said housing and said member at a predetermined speed, inlet means to said chamber for admitting fluid thereto and pressure sensing means for sensing a difference in pressure of the fluid at separate stations caused by said eccentricity, at least one station being intermediate the adjacent eccentrically positioned surfaces of said member and housing, and means for comparing a differential of said sensed pressures to provide an indication of the viscosity of the fluid when said housing and said member are driven in relative rotation.

13. A viscosity sensor according to claim 12 wherein a single fluid pressure port is located within said chamber and a second fluid pressure port is situated in a position to sense fluid pressure externally of said chamber and means are provided for registering a differential of said sensed pressures to provide an indication of the viscosity of the fluid.

14. A viscosity sensor according to claim 1 in which the pressure sensing means are at generally diametrically opposed positions and generally at positions perpendicular to a diameter of said chamber which includes a minimum and maximum clearance produced by said eccentricity.

References Cited in the file of this patent

UNITED STATES PATENTS

| 2,027,903 | Dintilhac | Jan. 14, 1936 |
| 2,198,325 | Wynn et al. | Apr. 23, 1940 |
| 2,869,358 | Heisig | Jan. 20, 1959 |
| 2,977,790 | Dubsky et al. | Apr. 4, 1961 |

FOREIGN PATENTS

| 539,751 | France | June 30, 1922 |

OTHER REFERENCES

Rich: abstract of application Serial Number 151,142, published Nov. 18, 1952, 664 O.G. 960.